(12) United States Patent
Hallman

(10) Patent No.: US 11,135,874 B2
(45) Date of Patent: Oct. 5, 2021

(54) SPACER

(71) Applicant: 100% Useful Pty. Ltd., Rowena (AU)

(72) Inventor: Martin Hallman, Rowena (AU)

(73) Assignee: 100% USEFUL PTY. LTD., Rowena (AU)

( * ) Notice: Subject to any disclaimer, the term of this patent is extended or adjusted under 35 U.S.C. 154(b) by 262 days.

(21) Appl. No.: 16/308,400

(22) PCT Filed: Jun. 9, 2016

(86) PCT No.: PCT/AU2016/050465
§ 371 (c)(1),
(2) Date: Dec. 7, 2018

(87) PCT Pub. No.: WO2017/210714
PCT Pub. Date: Dec. 14, 2017

(65) Prior Publication Data
US 2019/0143750 A1    May 16, 2019

(51) Int. Cl.
*B60B 35/10* (2006.01)
*B60B 35/14* (2006.01)

(52) U.S. Cl.
CPC .............. *B60B 35/10* (2013.01); *B60B 35/14* (2013.01); *B60B 2900/351* (2013.01)

(58) Field of Classification Search
CPC . B60B 35/10; B60B 35/1072; B60B 35/1081; B60B 35/109; B60B 35/14;
(Continued)

(56) References Cited
U.S. PATENT DOCUMENTS 876,386 A    1/1908 McMaster
1,822,093 A    9/1931 Hendrickson et al.
(Continued)

FOREIGN PATENT DOCUMENTS

| DE | 811786 C | 8/1951 | |
| GB | 1551431 A * | 8/1979 | ............. F16D 1/095 |
| WO | WO97/06966 A1 | 2/1997 | |

OTHER PUBLICATIONS

Written Opinion and International Search Report, International Application PCT/AU2016/050465, dated Aug. 1, 2016.
Extended European Search Report, Application No. 16904254.6-1012/3468815, PCT/AU2016050465 dated Jun. 24, 2020.
(Continued)

*Primary Examiner* — Kip T Kotter
*Assistant Examiner* — Emily G Castonguay
(74) *Attorney, Agent, or Firm* — M. J. Ram and Associates

(57) ABSTRACT

A spacer for coupling a wheel to a rotary output of a vehicle, the spacer including two connectors fixed relative to a respective first and second end of the spacer, the connectors each having a matching first array of fittings to engage a rim of the wheel, whereby to allow wheel gauge adjustment by disconnecting the wheel from a first one of the connectors, sliding the wheel along a body of the spacer and connecting the wheel to a second one the other connectors. The invention also relates to a method of adjusting wheel gauge on the spacer including releasing a wheel from one of the connectors, sliding the wheel along the body of the spacer and attaching the spacer to the other connector. The invention also relates to a spacer for supporting a wheel relative to a rotary output of a vehicle, the spacer being formed of modular sections that are separately attached by fasteners that connect only between adjacent sections to allow for independent addition and removal of sections to vary the length of the spacer.

15 Claims, 10 Drawing Sheets

(58) Field of Classification Search
CPC ..... B60B 2900/351; B60B 3/14; B60B 3/145; B60B 3/147
See application file for complete search history.

(56) References Cited

U.S. PATENT DOCUMENTS

| | | | |
|---|---|---|---|
| 2,682,430 A | | 6/1954 | Brubaker |
| 2,722,988 A | | 11/1955 | Kuhary et al. |
| 2,804,157 A | | 8/1957 | Preston |
| 2,819,117 A | | 1/1958 | Glazier, Jr. |
| 3,000,673 A | | 9/1961 | Lansing |
| 3,476,416 A | | 11/1969 | Gilmore, Jr. |
| 3,847,441 A | | 11/1974 | Morkoski et al. |
| 4,214,792 A | | 7/1980 | Ansteth et al. |
| 4,290,654 A | * | 9/1981 | Majkrzak ............... B60B 23/12 301/11.3 |
| 4,925,248 A | * | 5/1990 | Aderer ................... B60B 23/12 301/9.2 |
| 4,936,634 A | * | 6/1990 | Stratton ............. B60B 27/0026 301/111.03 |
| 5,005,913 A | * | 4/1991 | Kittle ...................... B60B 11/02 301/1 |
| 6,609,765 B2 | * | 8/2003 | Radke .................... B60B 11/02 301/111.03 |
| 7,731,301 B2 | * | 6/2010 | Pell ....................... B60B 27/065 301/128 |

OTHER PUBLICATIONS

Partial Supplementary European Search Report, Application No. 16904254.6-1012/3468815, PCT/AU2016050465 dated Jan. 29, 2020.

* cited by examiner

SPACER

FIELD

This invention relates to a spacer particularly but not exclusively a spacer for agricultural machinery such as a truck or tractor.

BACKGROUND

A tractor is generally manufactured with rear wheel axles that project a limited distance from rear wheel hubs. The axles are of a set length so as not to protrude beyond a predetermined distance that would otherwise prevent the tractor being shipped or driven onto a transport truck.

However, a larger wheel gauge is needed for agricultural work and to satisfy both shipping and agricultural needs, the tractor wheels are provided with a belled rim so that the tire is able to be positioned closer or further away from the tractor by removing, reversing and remounting the wheel in an opposite orientation although the limited length of the axle restricts the available maximum wheel gauge.

Tractor wheels have sizeable working tread and the tread is shaped to provide maximum purchase when the wheel is turning in only one direction. As a result, if the wheels need to be changed in order to increase or decrease the effective wheel gauge of the tractor, then the left and right wheels also need to be swapped in order for the tread to be facing the correct way.

Swapping tractor wheels can be time consuming and potentially unsafe given the crush hazard presented by the wheels and the weight of the vehicle.

SUMMARY

In one aspect, there is provided a spacer for coupling a wheel to a rotary output of a vehicle, the spacer including first and second connectors with a matching first array of fittings to engage a disc of the wheel, whereby to allow wheel gauge adjustment by disconnecting the wheel from the first connector, sliding the wheel along a body of the spacer and connecting the wheel to the second connector, the spacer further including a second array of fittings at a first end of the spacer for fixing the spacer to the rotary output, wherein the first connector is a mounting plate and the second array of fittings is provided in the mounting plate, angularly offset from the first array of fittings.

In another aspect, there is provided a spacer for coupling a wheel to a rotary output of a vehicle, the spacer including first and second connectors with a matching first array of fittings to engage a rim of the wheel, whereby to allow wheel gauge adjustment by disconnecting the wheel from the first connector, sliding the wheel along a body of the spacer and connecting the wheel to the second connector, the spacer further including a second array of fittings at a first end of the spacer for fixing the spacer to the rotary output, the spacer, further including a sleeve with a mounting plate at the first end of the spacer, wherein the mounting plate includes the second array of fittings and the sleeve includes a wall that steps down to a smaller diameter of the spacer body, the wall incorporating the first connector with the first array of fittings.

In another aspect, there is provided a spacer for coupling a wheel to a rotary output of a vehicle, the spacer including first and second connectors with a matching first array of fittings to engage a rim of the wheel, whereby to allow wheel gauge adjustment by disconnecting the wheel from the first connector, sliding the wheel along a body of the spacer and connecting the wheel to the second connector, wherein the body is formed of a plurality of modular sections, attached by fasteners that couple adjacent ends of the sections together to allow one or more sections to be added or removed independently of the attachment of the spacer to the rotary input, whereby to allow length adjustment of the spacer while retaining the wheel on the spacer and the spacer in fixed relation to the rotary output.

In another aspect, the spacer includes a body formed of modular sections, as described above, and the spacer includes a second array of fittings at a first end of the spacer for fixing the spacer to the rotary output, wherein the first connector is a mounting plate and the second array of fittings is provided in the mounting plate, angularly offset from the first array of fittings.

In one embodiment, the second array of fittings includes through holes and associated 20 recesses in a side of the mounting plate facing away from the first end of the spacer, to accommodate a respective nut or bolt head used to secure the mounting plate to the rotary output.

In one embodiment, the first end of the spacer includes an axial cavity.

In one embodiment, the cavity houses one or more hubs to support the spacer on an axle of the rotary output.

In one embodiment, the second connector is an adapter fastened to the second end of the spacer, the adapter including an inner array of attachment sites for connection to the end of the spacer.

In one embodiment, the first array of fittings of the adapter is a radial arrangement of holes concentric with the inner array of attachment sites.

In one embodiment, the second connector is a collar that slides along the length of the body and is adapted to be locked in position to define a different wheel gauge.

In another aspect, there is provided a method of adjusting wheel gauge on the spacer of described above, including releasing a wheel from one of the connectors, sliding the wheel along the body of the spacer and attaching the spacer to the other connector.

In another embodiment, there is provided a spacer for supporting a wheel relative to a rotary output of a vehicle, the spacer being formed of modular sections that are separately attached by fasteners that connect only between adjacent sections to allow for independent addition and removal of sections to vary the length of the spacer, while a first end of the spacer is rigidly connected to the rotary output of the vehicle.

BRIEF DESCRIPTION OF THE DRAWINGS

The invention is described by way of example only with reference to the accompanying drawings, in which.

DETAILED DESCRIPTION

Throughout the following description of various examples of different spacers, like components will be denoted by like reference numbers.

Figure 1:
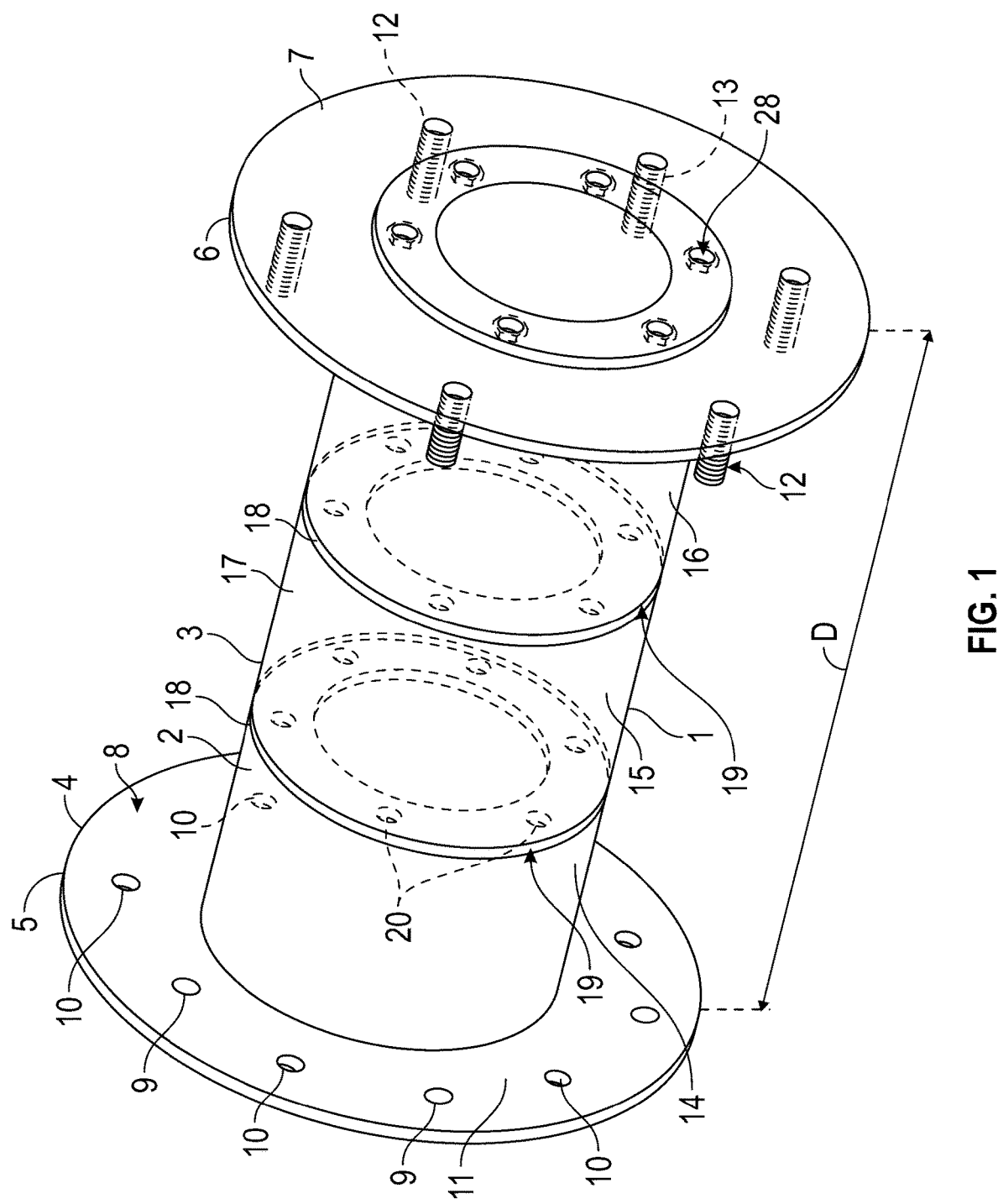
FIG. 1 is a diagrammatic view of a spacer.

Referring to FIG. 1, a wheel spacer 1 is shown that includes a body 2 with a cylindrical profile 3, a first connector 4 at a first end 5 and a second connector in the form of an adapter 6 at a second end 7.

The connector 4 includes a first array of fittings 8. The fittings 8 are shown as a series of spaced holes 9, however, the fittings 8 could be in any other suitable form such as threaded stubs, as required. A second array of fittings 10 is also provided on the connector.

The connector 4 is in the form of a mounting plate 11 and the first array of fittings 8 is used to attach a disc of a wheel (not shown) directly to the mounting plate 11 while the second array of fittings 10 is used to attach the spacer I to a rotary output of a vehicle (also not shown). Alternatively, the mounting plate 11 might be provided with only the first array of fittings 8 and common bolts or studs would then be used to both mount the wheel to the mounting plate 11 and also secure the mounting plate 11 to the rotary output of the vehicle.

The adapter 6 also has a first array of fittings 12. The fittings 12 are shown as threaded stubs 13 but may also have any other form such as threaded holes, or the like, as required. The configuration of the first array of fittings 12 on the adapter matches the first array of fittings on the mounting plate 11.

The body 2 is formed of modular sections 14, 15, 16 to provide a length dimension "D" to the spacer I and to distance the adapter 6 from the mounting plate 11. Each section 14, 15, 16 is formed with a tubular sleeve 17 and has an end 18 abutting an adjoining section 15, 16. The end 18 of each section 14, 15, 16 presents an attachment site 19 with an array of holes 20 or threaded stubs for connecting the adjacent section 15, 16.

The adapter 6 has an inner array of attachment sites 28, concentric to the array of fittings 12, that enable the adapter to be bolted to the outermost end 18 of the body 2.

Figure 2:
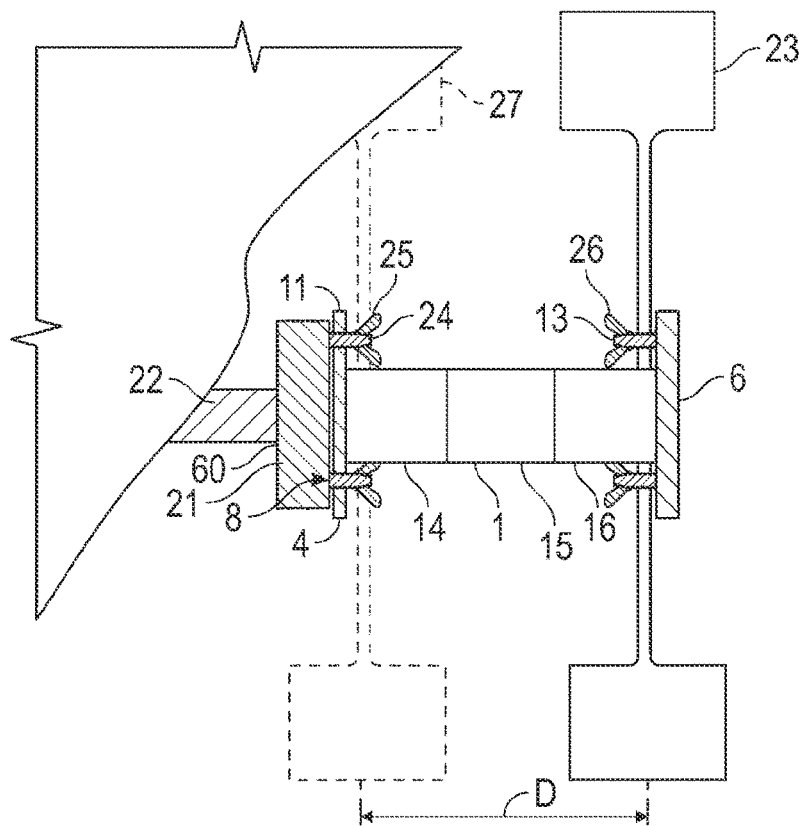
FIG. 2 is a diagrammatic view of a vehicle with a spacer.

FIG. 2 shows the spacer I fitted to a rotary output 60 in the form of a hub 21 of a vehicle 22 in order to distance a wheel 23 from the hub 21. Threaded studs 24 of the hub 21 are inserted through the first array of fittings 8 of the mounting plate 11 and secured in place using nuts 25. The disc of the wheel 23 is mounted to the threaded studs 13 projecting from the adapter 6 and is also secured in place using wheel nuts 26.

In that arrangement, the wheel 23 is separated from the hub 21 by all three sections 14, 15, 16. Each section 14, 15, 16 has a length dimension of, say, 1 metre, such that the wheel gauge is effectively increased by 3 metres.

The length dimension D of the spacer 1 is sufficient to accommodate a second wheel 27 in the event the vehicle 22 is set up for dual wheel operation. Alternatively, if a minimum wheel gauge is required, wheel 23 can simply be released from the adapter 6, slid along the spacer 1 and fixed onto the mounting plate 11 using the studs 24 passing through the matching array of fittings 8.

Figure 3:
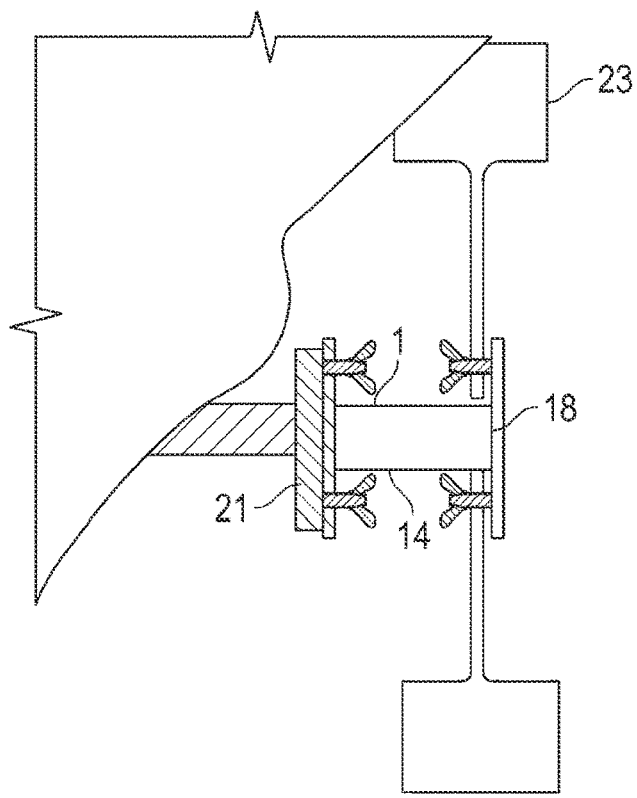
FIG. 3 is a diagrammatic view of the spacer with a modified length.

If the wheel gauge needs to be set between the maximum and minimum distance D, one or more of the sections 15, 16 can be removed, as shown in FIG. 3, where only the inner section 14 remains and the adapter 6 is fastened directly to the end 18 of that section 14 so that the spacer 1 provides an increased wheel gauge of only 1 metre.

It may be appreciated that the length adjustment of the spacer 1 can be achieved by firstly releasing the wheel 23 from the adapter and sliding the wheel 23 inward, which then allows the adapter 6 to be removed from the end 18 of the spacer 1. Additional spacer modules 14, 15, 16 can be added or removed, as required, and the adapter subsequently reattached for the wheel 23 to be mounted to. The wheel 23 remains on the spacer while the spacer 1 itself remains securely bolted to the vehicle hub 21 and there is no need for the wheel 23 to be removed during the process of adjusting the spacer length and changing the wheel gauge.

Figure 4:
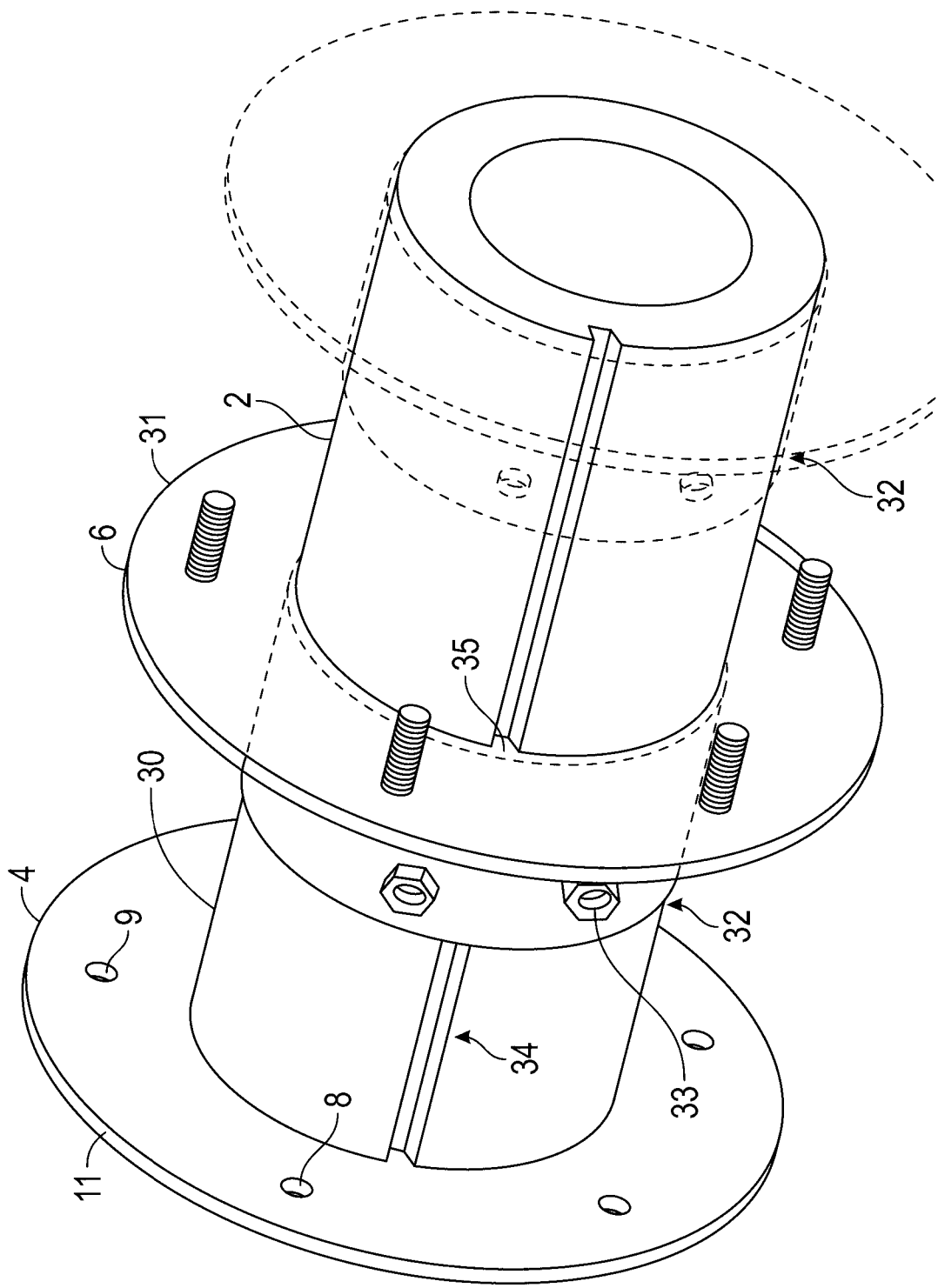
FIG. 4 is a diagrammatic view of another form of spacer.

FIG. 4 illustrates another form of spacer 30. The spacer 30 has similar components to the spacer 1 of FIGS. 1 to 3, and like parts are denoted with like reference numerals.

The spacer 30 has a connector 4 in the form of a mounting plate 11 with an array of fittings 8 in the form of holes 9, or threaded stubs if needed. The spacer 30 has a cylindrical body 2 and a second connector in the form of an adapter 6. The adapter 6 is a collar 31 arranged to slide lengthwise of the body 2.

The collar 31 is adapted to be locked onto the body 2 at different locations so as to provide multiple attachment sites 32 along the length of the spacer 1. Fasteners or bolts 33 are provided for that purpose.

The body 2 includes an axially extending slot 34 and the collar 31 includes a key 35. The key 35 fits in the slot 34 to guide the collar 31 as it moves along the body 2 and to transfer rotational loading between the body 2 and the collar 31.

The collar 31 has an array of fittings 12 that match and align with the fittings 9 of the first mount for the purpose of mounting a wheel (not shown) to the spacer 30.

As may be appreciated from the above, the spacer 30 provides multiple attachment sites 32 along the length of the spacer 30 so that a wheel can be mounted relative to a hub at multiple different locations, without requiring the wheel to removed from the spacer 30, which substantially reduces the crush hazard as compared to the prior art spacer, where the wheel needs to be removed entirely with any change of wheel gauge.

Figure 5:
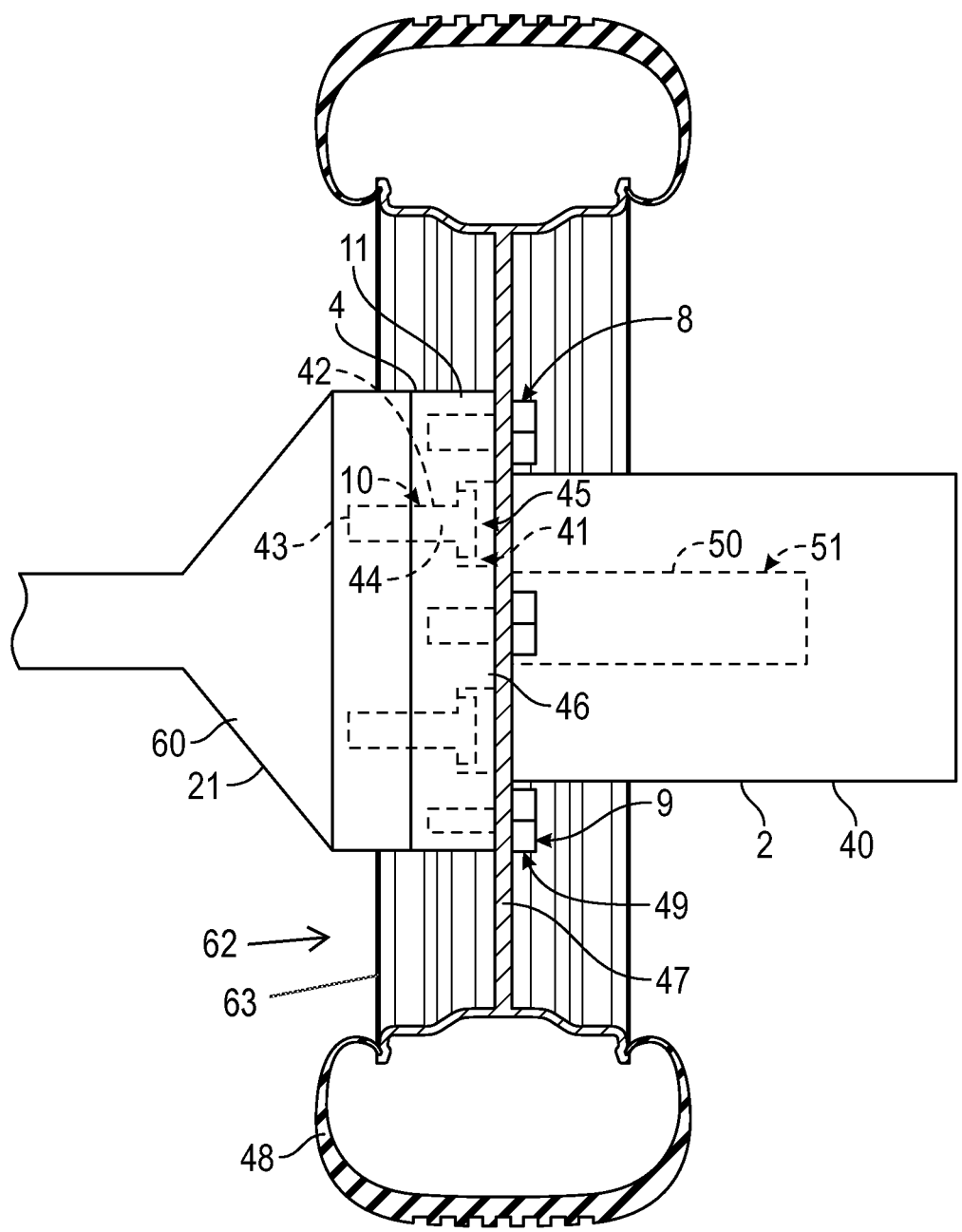
FIG. 5 illustrates another spacer fitted to a hub of a vehicle.

FIG. 5 shows a spacer 40 which includes a connector 4 formed of an mounting plate 11. The mounting plate 11 has a first array of fittings 8 and a second array of fittings 10. The second array of fittings 10 are in the form of bolt holes 42 that align with corresponding holes 43 in a rotary output 60 in the form of hub 21. Bolts 44 pass through the mounting plate 11 to fix the spacer 40 directly to the hub 21.

Recesses 45 are provided in a side 46 of the plate 11 facing away from the hub 21 to accommodate heads 41 of the bolts 44 used to connect the spacer 40 to the hub 21.

A wheel 62 comprises a rim 63 having a disc 47 and a tire 48 fitted to the rim 63. The disc 47 abuts the mounting plate 11 where pre-existing bolt holes 49 align with the first array of fittings 8 on the mounting plate 11 to allow the wheel 62 to be bolted to the plate 11. The bolt heads 41 are recessed in the plate 11 so as not to obstruct the attachment of the disc 47 to the plate 11.

Although the mounting plate 11 and the hub 21 are described as being connected by bolts 44 that have bolt heads 41 recessed in the plate 11, the connection may instead be by way of bolt studs projecting from the hub 21 and through the plate 11, in which case the recesses 45 will house securing nuts instead of bolt heads.

FIG. 5 also illustrates an axle 50 that projects out from the hub 21. The body 2 of the spacer 40 includes an internal cavity 51 that receives the axle 50 such that the axle 50 does not need to be removed from the hub 21 in order to install the spacer 40. The spacer 40 can also be supported on the axle 50.

Figure 6:
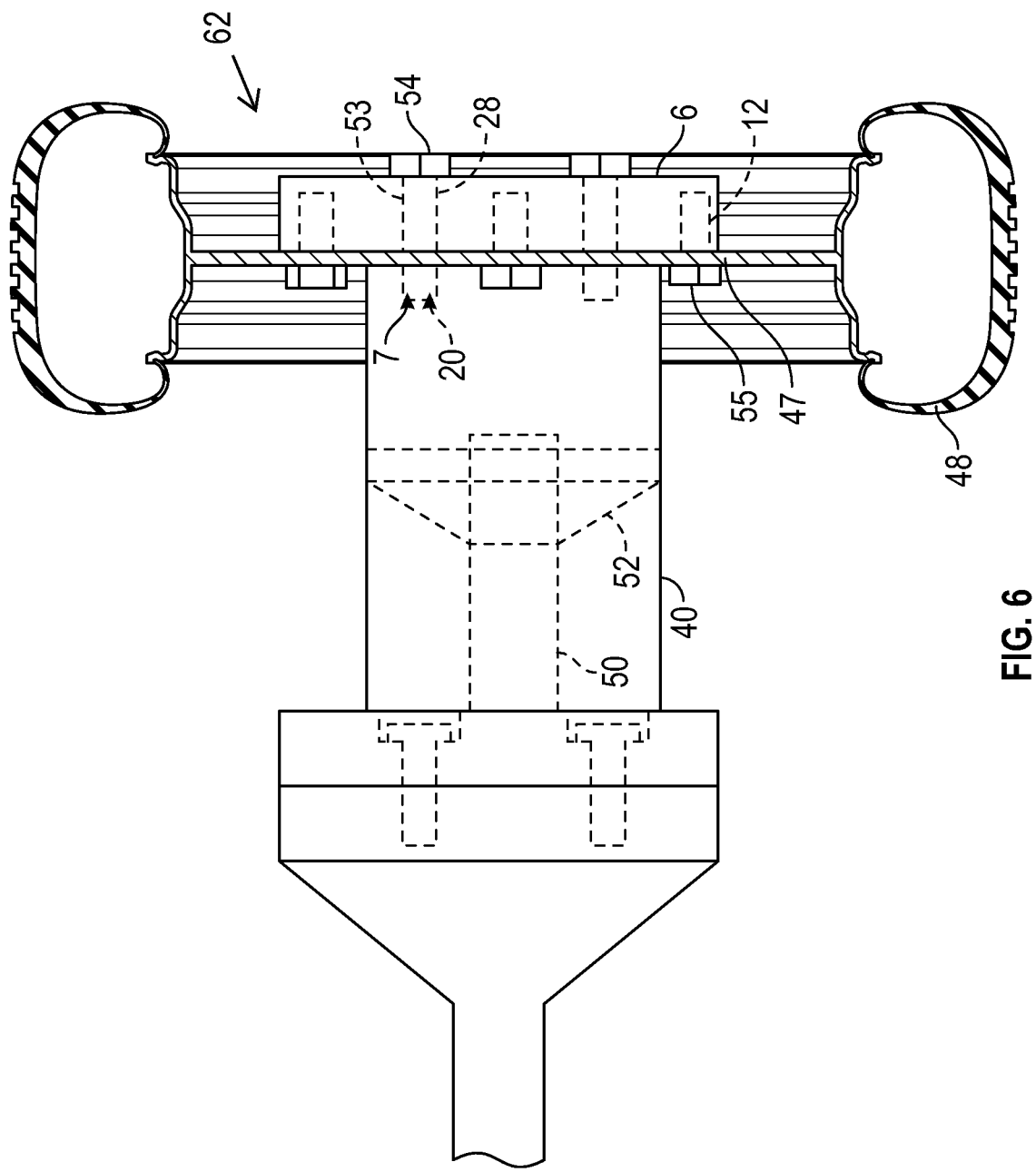
FIG. 6 is illustrates a modified spacer.

FIG. 6 shows the spacer 40 as having a brace 52 that supports the spacer 40 on the axle 50. The brace 52 may be mounted directly on the axle 50 to provide internal support to the body 2 of the spacer 40, in which case the spacer 40 is installed by being slid over both the axle 50 and brace 52. Alternatively, the brace 52 may be integrally formed with the body 2 and installed by sliding the brace 52 and body 2 into a supported position on the central axle 50.

FIG. 6 also shows the adapter 6 with a first set of attachment sites 28 arranged to connect the adapter 6 relative to an end 7 of the spacer 40. The sites 28 are in the form of through holes 53 that align with corresponding holes 20. Bolts 54 fix the adapter 6 in place. Alternatively, the adapter 6 may be provided with bolt studs (not shown) that connect directly into the end 7 of the spacer 40 or bolt studs may project from the spacer 40, in place of the holes 20.

With the adapter 6 in place, the wheel 62 is able to be fixed directly to the adapter 6 using suitable fasteners such as bolts 55 which engage with a first array of fittings 12 on the adapter 6.

As may be appreciated from FIGS. 5 and 6, in order to increase the wheel gauge, the disc 47 of the wheel 62 simply needs to be released from the mounting plate, slid along the spacer 40 and then attached to the adapter 6, without requiring the wheel 62 to be removed from the spacer 40.

Figure 7:
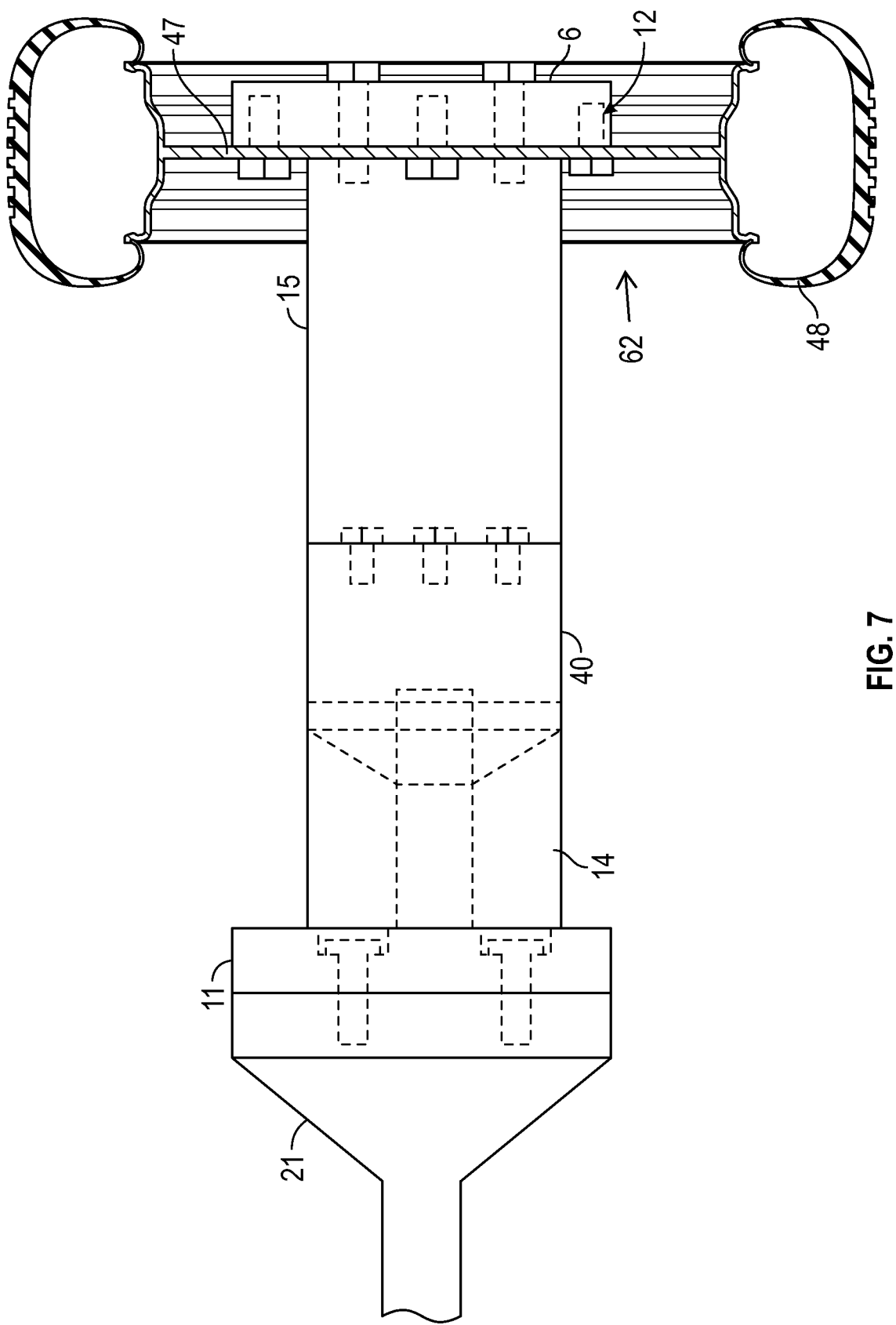
FIG. 7 illustrates yet another modified spacer with a modular extension.

FIG. 7 illustrates the spacer 40 with an extended length, where a second modular section 15 is bolted to the end 18 of the first section 14. This can be done while the wheel 62 remains on the first section 14. After the second section 15 is fixed in place, the adapter 6 can be attached and the wheel 62 slid along the spacer in order to attach the disc 47 to the array of fittings 12 on the adapter 6, again without having to remove the wheel 62 from the spacer 40.

While additional modular sections are added or removed, such as described with reference to FIGS. 1 to 3, to change the effective length of the spacer 40, the wheel 62 can be parked up against the mounting plate 11. The attachment of the mounting plate 11 to the hub 21 ensures the spacer 40 remains securely fixed in place to provide reliable support for the wheel 62. The individual spacer sections 14, 15 are bolted end-to-end with fasteners that are engaged and disengaged independently of the connection of the mounting plate 11 to the hub 21 and without compromising the integrity of the secure and rigid attachment of the spacer 40 to the hub 21.

Figure 8:
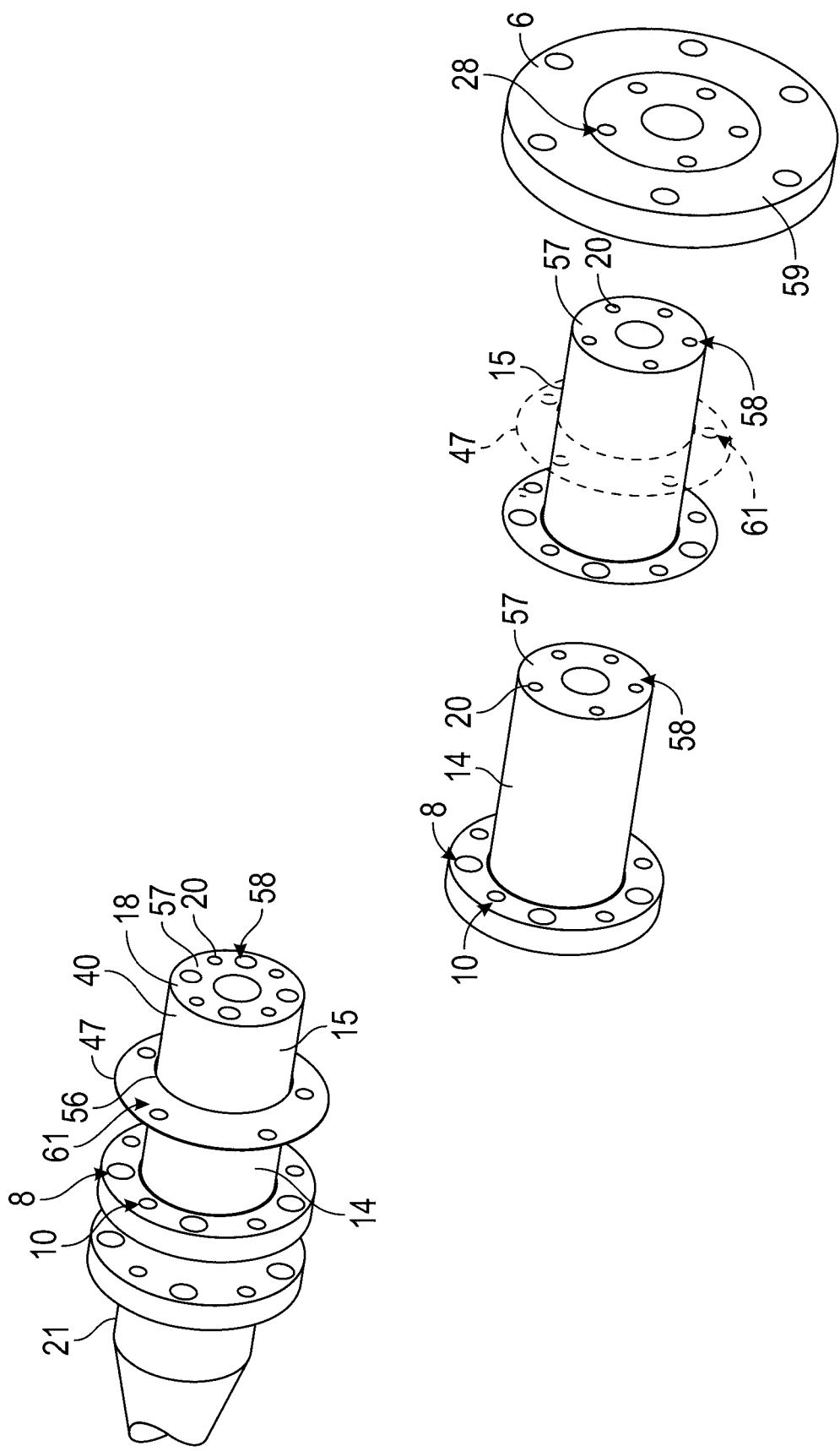
FIG. 8 is a perspective exploded view of the spacer of FIG. 7.

FIG. 8 shows the first array of fittings 8 and the second array of fittings 10 in the mounting plate 11 as being alternate holes in a circular configuration around the mounting plate 11. Each array 8, 10 is in an orientation that matches conventional and pre-existing stud/hole arrangements traditionally used to mount the disc 47 directly to the hub 21 so that the first array of fittings 8 on the mounting plate align with corresponding holes in the disc 47 and the second array of fittings 10 are in the same but angularly offset configuration.

The disc 47 is illustrated diagrammatically, without the remainder of the wheel. An inner diameter 56 of the disc 47 substantially matches the outer diameter of the spacer 40 so that the disc 47 is able to be stably supported on the spacer 40 when being slid between inner and outer wheel gauge positions.

The ends 18 of the spacer sections 14, 15 are formed with annular end plates 57 that have a circular array of fixtures 58 in the form of holes 20, although alternatively an arrangement of studs or other connectors could be used. The inner array of attachment sites 28 matches the circular arrangement of the fixtures 58. The first array of fittings in the adapter 6 are provided in an outer flange 59 which extends over a larger diameter in order to be aligned with and engage corresponding holes 61 in the disc 47.

Figure 9:
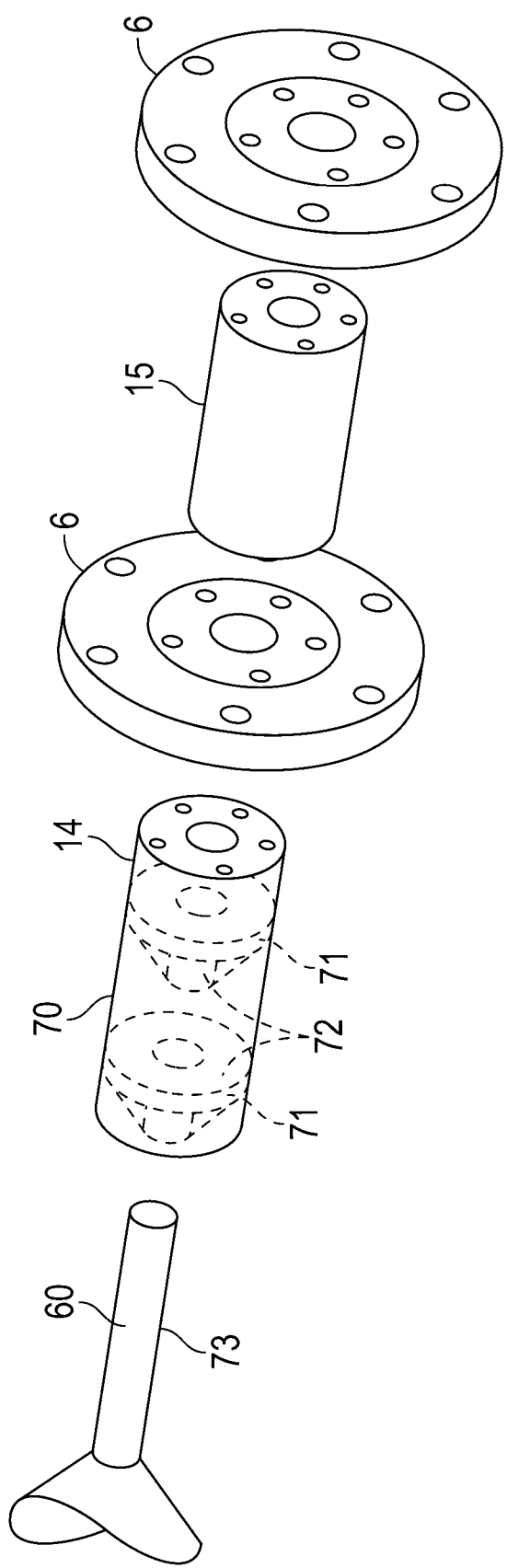
FIG. 9 is a perspective exploded view of another form of spacer.

Referring to FIG. 9, a modified spacer 70 is illustrated. The spacer 70 incorporates internal braces 71 in the form of hubs 72 that allow the spacer 70 to be installed directly onto a rotary input 60 in the form of axle 73 instead of connecting to an existing hub.

Figure 10:
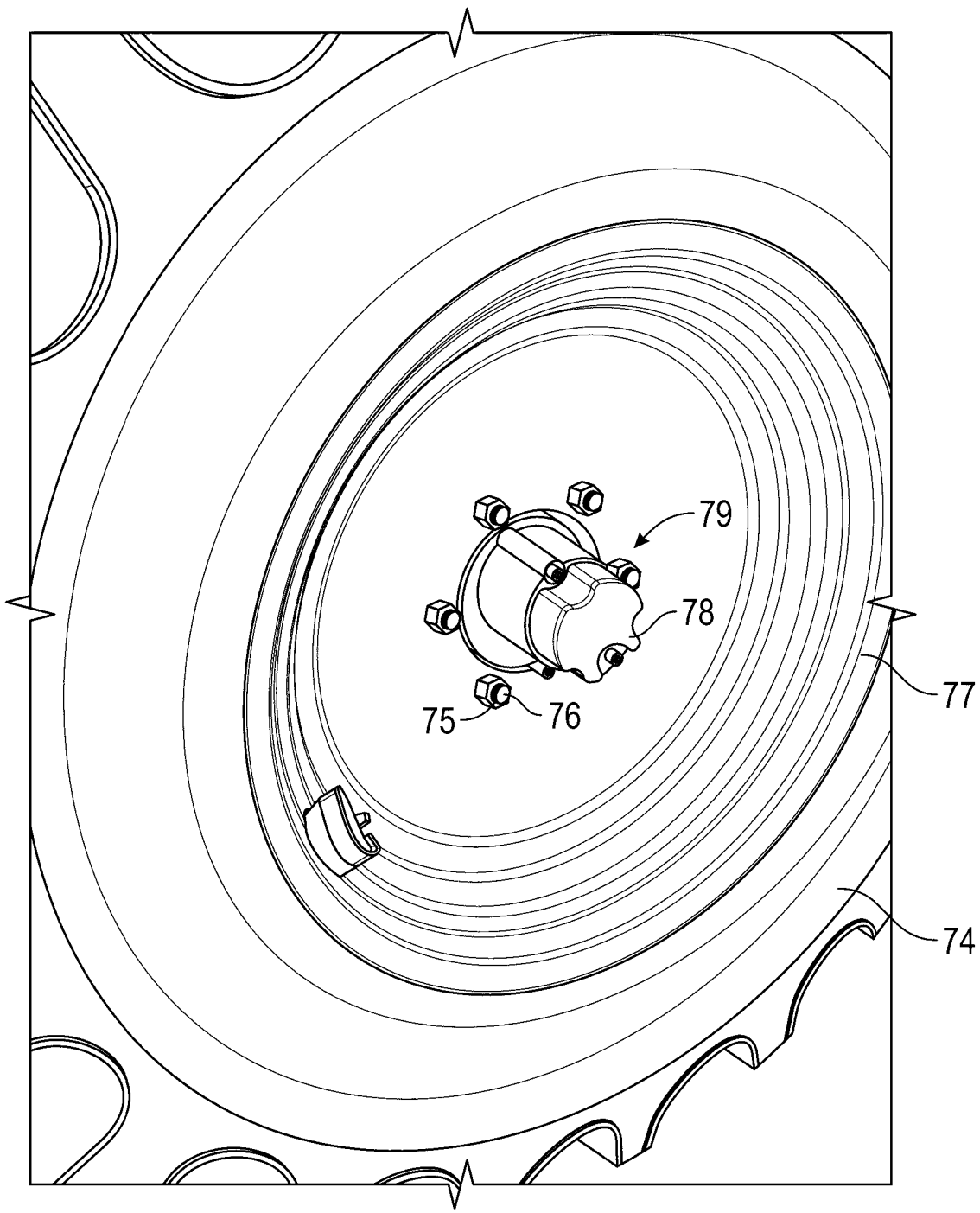
FIG. 10 is a view of a wheel with a central pump.

FIG. 10 shows a tractor wheel 74 with an array of studs 75 and locking nuts 76 that mount a rim 77 of the wheel 74 over a central casing 78 that projects through the wheel 74. The casing 78 may house pneumatic equipment 79 or equivalent arrangements may have central planetary gear equipment or the like traditionally associated with a front wheel axle of a tractor.

Figure 11:
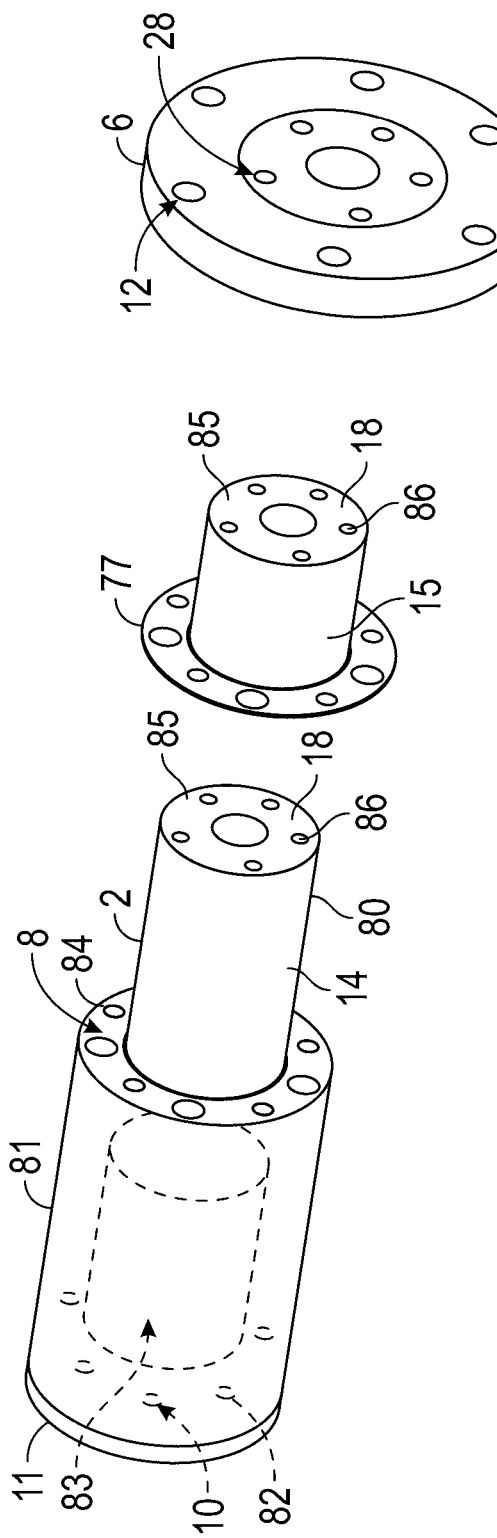
FIG. 11 is a perspective exploded view of another spacer.

FIG. 11 shows a spacer 80 that can be used in combination with such centrally arranged equipment 79. The spacer 80 has a mounting plate 11 at one end of a sleeve 81 with an array of fittings 10, in the form of bolt holes 82, and a central cavity 83 inside the sleeve 81 that accommodates the equipment of FIG. 10, when the spacer 80 is fitted onto the studs 75 shown in FIG. 10. The sleeve 81 has a length and outer diameter of sufficient dimension to receive the equipment 75.

An annular wall 84 provides a step-down in diameter from the sleeve 81 to the cylindrical body 2 of the spacer 80. An array of fittings 8 is provided in the wall 84 in a configuration matching the first array of fittings 12 in the adapter 6, for alignment with and attachment to mounting holes in a wheel rim 77.

The spacer 80 is formed of two sections 14, 15 although only one section 14 may be required or possibly more. The sections 14, 15 have annular end plates 85 with a circular array of attachment holes 86 and the adapter 6 is provided with a matching inner array of attachment sites 28.

The adapter 6 can be mounted to the end 18 of the section 15 and connected to the rim 77 for maximum wheel gauge or the section 15 can be removed and the adapter 6 mounted to the end 18 of the first section 14, for a shorter wheel gauge. Alternatively, the wheel 78 can be mounted directly to the first array of fittings 8 formed in the wall 84 for a minimum wheel gauge position. All of the different wheel gauge positions can be achieved without removing the wheel 74 from the spacer 80.

The invention has been described by way of non-limiting example only and many modifications and variations may be made without departing from the spirit and scope of the invention described.

The invention claimed is:

1. A spacer for coupling a wheel to a rotary output of a vehicle, the spacer including first and second connectors with a matching first array of fittings to engage a disc of the wheel, whereby to allow wheel gauge adjustment by disconnecting the wheel from the first connector, sliding the wheel along a body of the spacer and connecting the wheel to the second connector, the spacer further including a second array of fittings at a first end of the spacer for fixing the spacer to the rotary output, wherein the first connector is a mounting plate and the second array of fittings is provided in the mounting plate, angularly offset from the first array of fittings.

2. The spacer of claim 1, wherein the second array of fittings includes through holes and associated recesses in a side of the mounting plate facing away from the first end of the spacer, to accommodate a respective nut or bolt head used to secure the mounting plate to the rotary output.

3. A spacer for coupling a wheel to a rotary output of a vehicle, the spacer including first and second connectors with a matching first array of fittings to engage a disc of the wheel, whereby to allow wheel gauge adjustment by disconnecting the wheel from the first connector, sliding the wheel along a body of the spacer and connecting the wheel to the second connector, the spacer further including a second array of fittings at a first end of the spacer for fixing the spacer to the rotary output, the spacer further including a sleeve with a mounting plate at the first end of the spacer, wherein the mounting plate includes the second array of fittings and the sleeve includes a wall that steps down to a smaller diameter of the spacer body, the wall incorporating the first connector with the first array of fittings.

4. The spacer of claim 1, wherein the spacer includes an axial cavity.

5. The spacer of claim 4, wherein the cavity houses one or more hubs to support the spacer on an axle of the rotary output.

6. A spacer for coupling a wheel to a rotary output of a vehicle, the spacer including first and second connectors with a matching first array of fittings to engage a disc of the wheel, whereby to allow wheel gauge adjustment by disconnecting the wheel from the first connector, sliding the wheel along a body of the spacer and connecting the wheel to the second connector, wherein the body is formed of a plurality of modular sections, attached by fasteners that couple adjacent ends of the sections together to allow one or more sections to be added or removed independently of the attachment of the spacer to the rotary input, whereby to allow length adjustment of the spacer while retaining the wheel on the spacer and the spacer in fixed relation to the rotary output.

7. The spacer of claim 1, wherein the second connector is an adapter fastened to the second end of the spacer, the adapter including an inner array of attachment sites for connection to the end of the spacer.

8. The spacer of claim 7, wherein the first array of fittings of the adapter is a radial arrangement of holes concentric with the inner array of attachment sites used to connect the adapter to the body of the spacer.

9. The spacer of claim 1, wherein the second connector is a collar that slides along the length of the body and is adapted to be locked in position to define a different wheel gauge.

10. The spacer of claim 6, further including a second array of fittings at the first end for fixing the spacer to the rotary output, wherein the first connector is a mounting plate and the second array of fittings is provided in the mounting plate, angularly offset from the first array of fittings.

11. The spacer of claim 10, wherein the second array of fittings includes through holes and associated recesses in a side of the mounting plate facing away from the first end of the spacer, to accommodate a respective nut or bolt head used to secure the mounting plate to the rotary output.

12. The spacer of claim 3, wherein the spacer includes an axial cavity.

13. The spacer of claim 12, wherein the cavity houses one or more hubs to support the spacer on an axle of the rotary output.

14. The spacer of claim 6, wherein the spacer includes an axial cavity.

15. The spacer of claim 14, wherein the cavity houses one or more hubs to support the spacer on an axle of the rotary output.

* * * * *